Feb. 21, 1967  R. W. NORDIN  3,304,599
METHOD OF MANUFACTURING AN ELECTROMAGNET HAVING A U-SHAPED CORE

Filed March 30, 1965  2 Sheets-Sheet 1

INVENTOR
ROBERT W. NORDIN
BY R. C. Terry
ATTORNEY

Feb. 21, 1967  R. W. NORDIN  3,304,599
METHOD OF MANUFACTURING AN ELECTROMAGNET HAVING A U-SHAPED CORE
Filed March 30, 1965  2 Sheets-Sheet 2

3,304,599
METHOD OF MANUFACTURING AN ELECTROMAGNET HAVING A U-SHAPED CORE
Robert W. Nordin, Skokie, Ill., assignor to Teletype Corporation, Skokie, Ill., a corporation of Delaware
Filed Mar. 30, 1965, Ser. No. 443,968
4 Claims. (Cl. 29—155.57)

This invention relates to an electromagnet having a multiple wire core and to a method of manufacturing it and more particularly to an electromagnet having a mushroom-shaped magnetic structure which is comprised of a plurality of wires of a magnetic material and a method of manufacturing electromagnets of this structure.

In order that electromagnets may be as efficient as possible while at the same time being strong and quick to operate it is desirable to reduce the eddy current losses in the cores of the electromagnets as much as possible. To this end many electromagnets have been provided with cores comprised of insulated laminations of magnetic material. This technique has not been employed in connection with electromagnets having mushroom-shaped core structures due to the problems inherent in laminating structures of this shape.

Accordingly, an object of this invention is to improve the design of electromagnets.

Another object of this invention is to provide a strong, efficient electromagnet which is quick to respond to changes in the amount of current flowing through its energizing coil and which has a minimum of eddy current losses.

A further object of this invention is to provide a mushroom-shaped magnetic structure which is comprised of a plurality of U-shaped wires.

A still further object of this invention is to provide a method of manufacturing electromagnets of this type.

According to the preferred embodiment of the invention these and other objects are achieved by positioning a plurality of U-shaped iron wires in a position wherein the spaces between the legs of the wires form an annular cavity or tore. An energizing coil is positioned in the cavity thus formed so that one leg of each of the wires is within the energizing coil and so that the other leg of each of the wires is without the energizing coil. A nylon sleeve is positioned around the outer portions of the U-shaped wires to hold them in place. The portion of the cavity not filled by the energizing coil is filled with resin so that wires, the energizing coil and the sleeve are formed into a unitary structure. One way in which this electromagnetic structure may be manufactured is by grouping a plurality of wires of a magnetic material into a bundle. This bundle is then encircled by an energizing coil and the wires are bent over the coil so that the individual wires are U-shaped and so that the bundle of wires is formed into an annular configuration. The assembly thus formed is then slipped into a nylon sleeve and liquid resin is poured into any holes and gaps which remain inside the sleeve.

A more complete understanding of the invention may be had by referring to the following detailed description when taken in conjunction with the drawings wherein.

Figure 1:
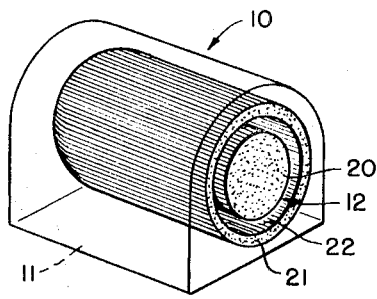
FIG. 1 is a front perspective view of the preferred embodiment of an electromagnet made in accordance with the invention.
Figure 2:
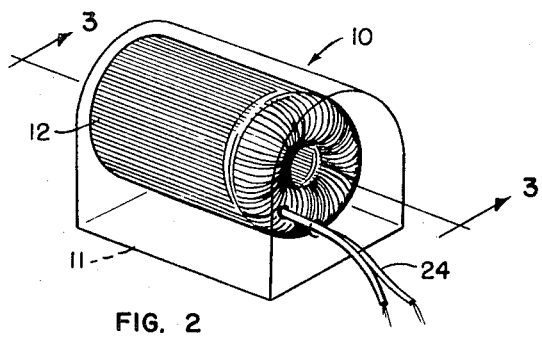
FIG. 2 is a rear perspective view of the device shown in FIG. 1.
Figure 3:
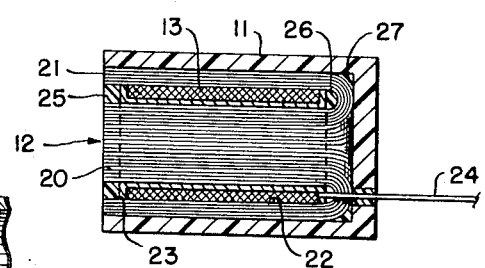
FIG. 3 is a longitudinal vertical sectional view taken along the line 3—3 in FIG. 2 in the direction of the arrows.

Referring now to the drawings wherein like reference numerals indicate like parts throughout the several views, with particular reference being had to FIGS. 1, 2, and 3, there is shown an electromagnet 10. This electromagnet 10 is comprised generally of an outer shell 11, a magnetic core structure 12, and an energizing coil 13. The outer shell 11 is formed from an insulating material and is shown in the drawings as being transparent in nature in order more clearly to illustrate certain features of the core structure 12. The shell 11 may, however, be of any desired color and need not be transparent.

The magnet core structure 12 is generally of mushroom-shaped configuration. The core is comprised of a plurality of enamel coated U-shaped wires which are formed from a magnetic material such as iron or steel. One leg of each of the wires is joined into a cylindrical bundle of wires 20 while the other leg of each of the wires forms a part of an outer annular ring 21 which surrounds the cylindrical bundle of wires 20. The U-shaped wires are positioned so that the spaces between their legs form an annular slot 22 between the cylindrical bundle of wires 20 and the annular ring 21.

In the annular slot 22 there is positioned the energizing coil 13 which is wound upon a bobbin 23. The energizing coil 13 is toroidal in shape and is formed from a continuous length of an insulated conductor such as copper. The ends of this conductor form a pair of wires 24 which extend from the coil 13 through the shell 11 to serve as terminals for the coil. When a potenital is applied to the wires 24 a current is passed through the energizing coil 13 which generates flux in the legs of the wires which comprise the cylindrical bundle of wires 20. This flux is in turn directed by the wires into the annular ring 21. Since the wires are enamel coated, eddy currents flowing between the wires are held to an absolute minimum and thus there is very little eddy current loss. Since the core 11 is generally of the shape which the flux would take were there no core present, the core 11 aids and directs the flux into a generally mushroom-shaped configuration.

The portions of the annular slot 22, which are not filled by the bobbin 23, and the coil 13 are filled with an insulating material such as a casting resin, which is shown in FIG. 1 as being transparent although it may be of any desired color. For example, there is a doughnut-shaped portion of resin 25 just to the left of the coil 13 (FIG. 3), a similarly shaped portion of resin 26 just to the right (FIG. 3) of the coil 13 and a ring shaped resin portion 27 between the core 12 and the shell 11. This resin serves to form the bobbin 23, the energizing coil 13, the magnetic core structure 12 and the shell 11 into a solid unitary body.

Figure 4:
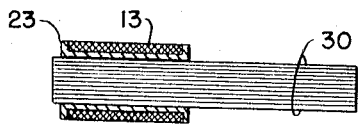
FIG. 4 illustrates a first step in a method of making a device embodying the invention.
Figure 5:
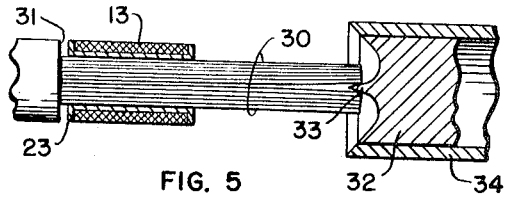
FIG. 5 illustrates a second step.
Figure 6:
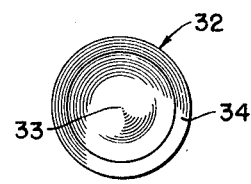
FIG. 6 is an end view of a tool employed in the step shown in FIG. 5.
Figure 7:
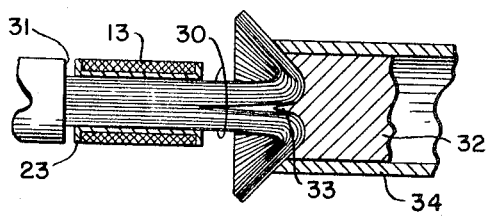
FIG. 7 illustrates a third step.
Figure 8:
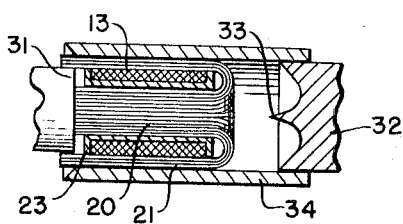
FIG. 8 illustrates a fourth step.

The magnetic structure just described may be formed by the method shown in FIGS. 4 through 9. In particular, FIG. 4 shows a plurality of wires joined into a bundle of wires 30. The wires forming this bundle have previously been coated with enamel and when they are grouped into the bundle 30 their axes are made to lie substantially parallel. The bundle of wires 30 is then encircled near one of its ends with a bobbin 23 having an energizing coil 13 wound on it. As is shown in FIG. 5, the encircled end of the bundle of wires 30 is then placed against a flat surface 31 and a spreading tool 32 is brought into engagement with its opposite end. As is shown in FIGS. 5 and 6 the spreading tool 32 has a point 33 which engages the bundle of wires 30 approximately on the center line of the bundle. As is shown in FIG. 7, the tool 32 is moved to the left and the conic sides of the point 33 then cause the wires which comprise the bundle 30 to bend about the energizing coil 13 so that the individual wires which make up the bundle 30 assume a U-shaped configuration and so that the bundle of wires 30, taken as a whole, assumes an annular configuration about the energizing coil 13. After the bending operation is complete, a sleeve 34, the left end of which previously formed part of the spreading portion of the tool 32, is brought forward around the outer portions of the wires which make up the bundle of wires 30. As is shown in FIG. 8, this sleeve 34 serves to hold the wires in their U-shaped configuration and serves to hold the bundle of wires in its annular configuration. It should be noted that the cylindrical bundle of wires 20, the annular ring 21 and the annular slot 22 are completely formed at this time and that the magnet 10 is substantially complete with the exception of the outer shell 11 and the inner resin filler.

Figure 9:
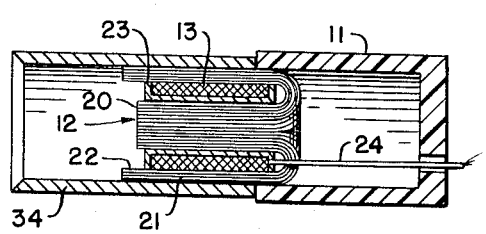
FIG. 9 illustrates a fifth step.

As is shown in FIG. 9 the coil 13, the bobbin 23 and the wires which comprise the magnetic core structure 12 are pushed out of the sleeve 34 and into a sleeve 11 which may be formed of any suitable insulating material such as nylon. As the core 12 is slid into the shell 11 the pair of wires 24 is guided through a hole in the right-hand end (FIG. 9) of the sleeve 11. The sleeve 11 is then tripped onto its bottom end (right end FIG. 9) and liquid resin is poured into the top (left end FIG. 9) of the sleeve 11. This liquid casting resin has a very low viscosity and, therefore, it flows into all gaps and holes remaining inside of the sleeve 11. In particular, the resin fills the portions 25, 26 and 27 as seen in FIG. 3 and the hole through which the wires 24 were passed.

As an alternative to the latter steps of the above outlined method the sleeve 34 may be of an insulating material. In this case the step shown in FIG. 9 above may be eliminated and the right-hand end (FIG. 8) of the sleeve 34 may be brought against a suitable backing plate 35 (FIG. 10) which is in a horizontal position. Resin may then be poured into the upper end of the sleeve 34 so that the resin fills all the open spaces within the sleeve 34. If this method is followed not only will the resin fill all the empty spaces within the sleeve, in particular, the spaces 25 and 26 of FIG. 3, but also will form the rear end of the outer shell 11 of the magnet. Regardless of whether the method shown in FIG. 9 or the method shown in FIG. 10 is employed for encasing the magnetic core structure 12 the magnet should be cut along a suitable line, such as the line 36 in FIG. 10 after the resin has hardened to assure that the end of the core 12 will not be resin covered.

Figure 11:
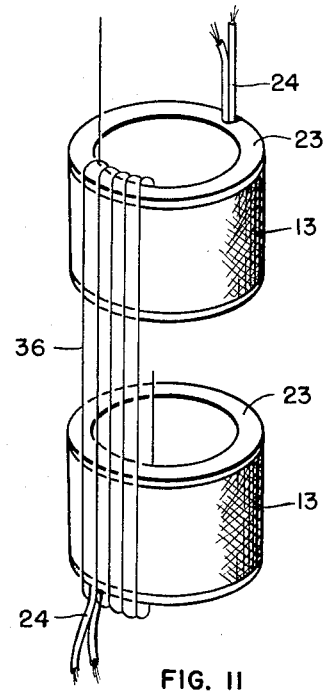
FIG. 11 illustrates a first step in an alternative method of making a device embodying the invention.
Figure 12:
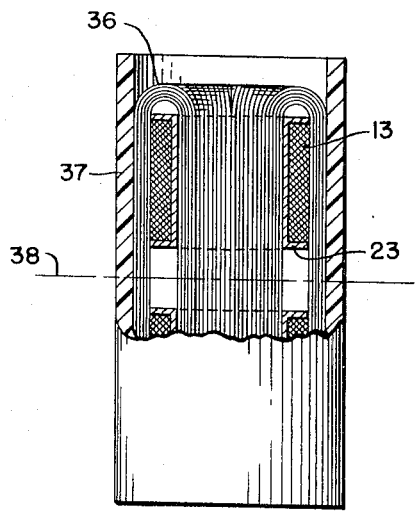
FIG. 12 illustrates a second step in the alternative method.
Figure 13:
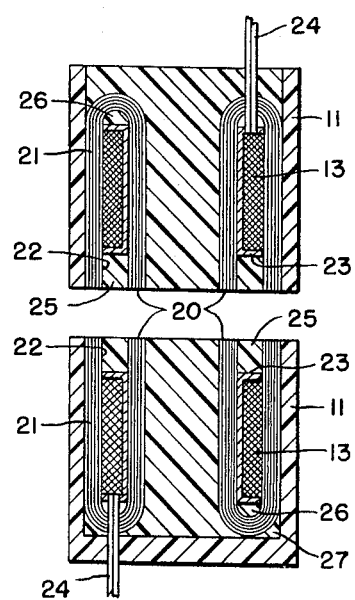
FIG. 13 illustrates a third step in the alternative method.

As an alternative to the above-described method of manufacture, the magnet may be formed by means of the steps shown in FIGS. 11, 12, and 13. In this method two energizing coils 13, which are wound upon bobbins 23, are placed in axial alignment one with the other and with a predetermined space between them. As is shown in FIG. 11 an enamel coated wire 36 of a magnetic material such as iron or steel is then wound around both of the coils 13 in toroidal fashion. This winding is continued until the space in the middle of the coils 13 is filled as nearly as possible. As is shown in FIG. 12 a nylon sleeve 37 is then slipped over the outer portion of the wire 36 to hold it in its toroidally wound configuration. Liquid resin is then poured into the sleeve 37 so that all spaces inside of the sleeve 37 are filled. Finally, the structure is cut in a suitable plane perpendicular to the axis of the coils 13 and lying between the coils 13, such as the plane represented by line 38 in FIG. 12.

If this method is followed two magnets will result. As is shown in FIG. 13 one of these magnets will be similar to the magnet formed by means of the steps shown in FIG. 9 in that the rear end of the magnet will be formed from nylon and will be an integral part of the shell 11. The other of the magnets formed by this method will be similar to the magnet formed by the method shown in FIG. 10 in that the rear wall of the shell 11 will be formed from resin.

Figure 10:
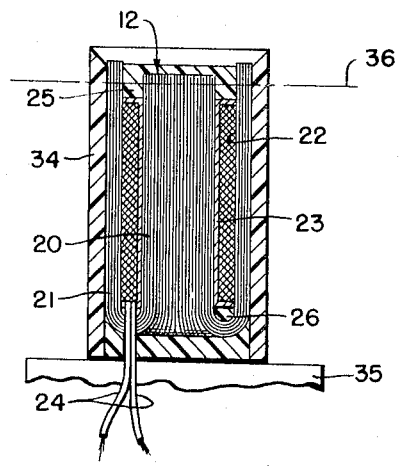
FIG. 10 illustrates a step in the method which may be substituted for the fifth step of the method shown in FIGS. 4 through 9.

As alternative steps in this method the shell 37 may be open-ended on both ends and in this case one end of the shell is brought against a backing plate in a manner similar to the teaching of FIG. 10. If this alternative step is followed both of the resulting magnets will be similar in nature to the magnet formed by the method of FIG. 10 in that both of the magnets will have the rear walls of their shells 11 formed from resin.

Although only one embodiment of the device is shown and described herein and although only two methods of manufacturing the device are described it should be understood that the invention is not limited to the structure and methods described, but is capable of modification and rearrangement without departing from the spirit of the invention.

What is claimed is:
1. A method of making an electromagnet including the steps of:
   positioning two energizing coils in axial alignment one with the other and with a predetermined space between them;
   winding an insulated wire of magnetic material simultaneously about both the coils in toroidal fashion;
   encapsulating the coils and the wires in an insulating material, and
   cutting the turns of wire in a plane lying perpendicular to the axis of the coils and in the space between the coils.
2. A method of making an electromagnet including the steps of:
   forming two energizing coils from insulated copper wire;
   positioning the two energizing coils in axial alignment one with the other and with a predetermined space between them;
   winding an insulated wire of magnetic material simultaneously about both the coils in toroidal fashion;
   encasing the energizing coils and the wire of magnetic material in a sleeve of insulating material;
   encapsulating the energizing coils in a casting resin to secure them with respect to the wire of magnetic material, and
   cutting the wire of magnetic material, the sleeve of insulating material and the resin in a plane substantially perpendicular to the axes of the energizing coils and between the coils.
3. A method of making an electromagnet including the steps of:
   winding a wire of magnetic material around a coil of conductive material in toroidal fashion; and
   cutting the wire of magnetic material in a plane substantially perpendicular to the axis of the coil of conductive material thereby forming a plurality of U-shaped wires of magnetic material each having one leg within the coil and one leg without the coil.
4. A method of making an electromagnet including the steps of:
   enclosing a coil of conductive material in a toroid of continuous magnetic wire; and
   cutting the annulus in a plane substantially perpendicular to the axis of the coil so that the coil is substantially surrounded by U-shaped wires of magnetic material.

(References on following page)

References Cited by the Examiner

UNITED STATES PATENTS

| | | | |
|---|---|---|---|
| 619,760 | 2/1899 | Kinraide | 336—83 |
| 1,597,901 | 11/1926 | Kent | 336—96 X |
| 2,962,679 | 11/1960 | Stratton | 336—83 |

FOREIGN PATENTS

| | | |
|---|---|---|
| 352,251 | 4/1922 | Germany. |
| 260,731 | 11/1926 | Great Britain. |

References Cited by the Applicant

UNITED STATES PATENTS

| | | |
|---|---|---|
| 1,501,787 | 7/1924 | Lacy. |
| 1,586,877 | 6/1926 | Buckley. |
| 1,703,618 | 2/1929 | Groehn. |
| 2,200,263 | 5/1940 | De Kramolin. |
| 2,313,774 | 3/1943 | Scott. |
| 2,600,473 | 6/1952 | Brockman. |
| 2,885,648 | 5/1959 | Bugg. |

LEWIS H. MYERS, *Primary Examiner.*

C. TORRES, T. J. KOZMA, *Assistant Examiners.*